(12) United States Patent
Robins et al.

(10) Patent No.: US 6,549,729 B1
(45) Date of Patent: Apr. 15, 2003

(54) CAMERA THAT OPERATES IN ACCORDANCE WITH THE SPEED REQUIREMENTS OF THE PHOTOGRAPHER

(75) Inventors: Mark N. Robins, Greeley, CO (US); Heather N Bean, Fort Collins, CO (US); Matt Flach, Fort Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/997,675

(22) Filed: Nov. 28, 2001

(51) Int. Cl.[7] .................... G03B 7/00; G03B 13/36; G03B 17/38
(52) U.S. Cl. .................. 396/103; 396/124; 396/246; 396/502
(58) Field of Search ................. 396/103, 124, 396/89, 263, 265, 264, 502, 266, 503, 130, 246, 250, 121–123

(56) References Cited

U.S. PATENT DOCUMENTS

| | | | | |
|---|---|---|---|---|
| 4,464,037 A | * | 8/1984 | Terui et al. ................. | 396/130 |
| 4,907,025 A | * | 3/1990 | Ikeno et al. ................ | 396/130 |
| 5,307,113 A | * | 4/1994 | Egawa .................... | 396/502 X |

* cited by examiner

Primary Examiner—W. B. Perkey
(74) Attorney, Agent, or Firm—David W. Boyd

(57) ABSTRACT

A camera senses the speed with which the photographer actuates the shutter release. This speed is interpreted as a measure of the urgency of the photograph. The camera modifies its operation in accordance with the urgency measure to give appropriate priority to taking the photograph quickly.

33 Claims, 4 Drawing Sheets

CAMERA THAT OPERATES IN ACCORDANCE WITH THE SPEED REQUIREMENTS OF THE PHOTOGRAPHER

FIELD OF THE INVENTION

The present invention relates generally to photography.

BACKGROUND OF THE INVENTION

Photographs are taken in a wide variety of situations. In some situations, such as still life photography, the speed of operation of the camera is of little importance. The photographer may spend considerable time arranging the scene to be photographed, placing lights, and selecting camera settings. The time required for the camera to perform an automatic focus or determine proper exposure is inconsequential.

Photographs taken in other situations are time-critical. For example, in photographing a sporting event, a primary goal is to capture dramatic scenes that are often unpredictable and nearly instantaneous. In this situation, the speed at which a camera operates is extremely important.

However many cameras, especially those designed for consumer use, do not accommodate this variation in time criticality. The camera performs the same sequence of steps, including selecting focus and exposure settings, regardless of the circumstances under which the photograph is being taken. This is frequently an area of dissatisfaction for camera users. At times when the photographer would prefer to modify the camera's criteria for its settings, and may even be willing to compromise the thoroughness or flexibility of the camera's operation in order to capture a fleeting photographic opportunity, the camera provides no mechanism for doing so. This is especially true for users of digital cameras.

There is a need for a camera that can accommodate an urgent photographic opportunity.

SUMMARY OF THE INVENTION

A camera senses the speed with which the photographer actuates the shutter release. The actuation speed is taken as an indication of the urgency of taking the photograph. The camera tailors its operation based on the actuation speed, thus ensuring that urgent photographs are taken quickly. Alternatively or additionally, the camera may select a relatively short exposure time for urgent photographs.

DETAILED DESCRIPTION OF THE PREFERRED EMBODIMENT

Figure 1:
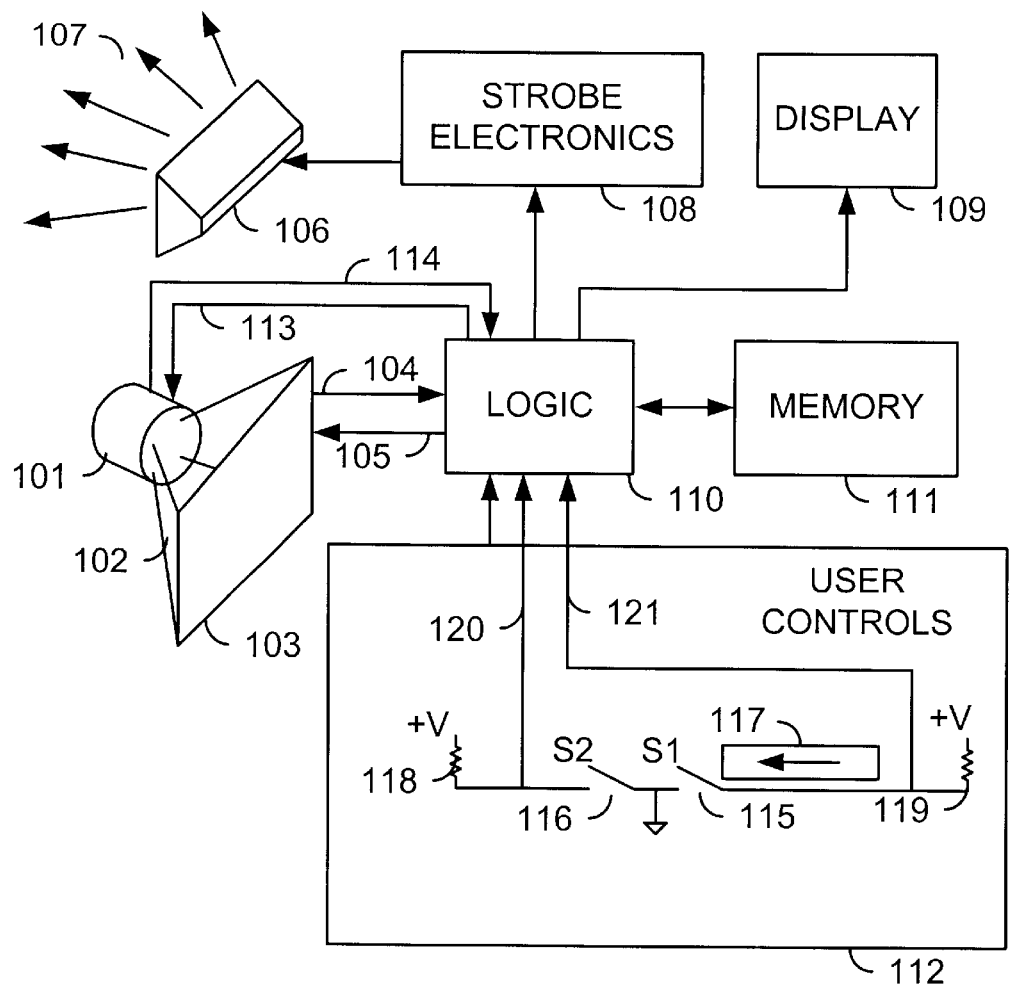
FIG. 1 is a simplified block diagram of a camera.

FIG. 1 shows a block diagram of a camera. The lens (101) gathers light from a scene (not shown). The gathered light is redirected (102) to form an image of the scene on an image surface (103), which may be an electronic array light sensor in a digital camera or may be the film in a film camera. The operation of a focusing mechanism, which may include all or part of the lens (101), may be controlled by control signals (113) from a logic unit (110), which may contain a microprocessor system, a system clock, and a frequency generator. Control signals (113) may also control the lens aperture (not shown). Feedback signals (114) indicating the position of the focusing mechanism may flow from the lens (101) to the logic unit (110). A flash, or strobe (106) may be utilized to supply additional light (107) to the scene. The strobe is operated by the strobe electronics (108), which in turn are controlled by the logic unit (110). The camera may comprise a display (109) on which image data or status information may be shown. The camera may comprise a memory (111) for storage and recall of image data, as well as data interchange with other devices (not shown).

If the camera is digital, the operation of sensor at the image surface (103) may be controlled by control signals (105) from logic unit (110), and image information signals (104) flow from the sensor to the logic unit (110).

The user of the camera may operate various control inputs (112) in order to affect the operation of the camera. Specifically, the user may actuate a shutter release (117), which by its action closes switch S1 (115) and S2 (116) in turn. Signals (120, 121) from switches S1 and S2 (115, 116) are fed to the logic unit (110).

For the purposes of this disclosure, a shutter release is the control by which the user of the camera initiates a photograph.

The camera may also comprise other controls and features that are omitted here for clarity.

The pair of switches S1 and S2 (115, 116), shown schematically in FIG. 1 is a common feature in many modern cameras. Typically, the shutter release (117) activates these two switches sequentially. When the user presses the shutter release (117) partway down, switch S1 is activated. This is sometimes referred to as the "S1 position." In the example embodiment of FIG. 2, switches S1 and S2 (115, 116) are normally open, and are closed when activated. Also in FIG. 2, pull-up resistors (118) and (119) ensure that the signal (120, 121) going to the logic unit (110) from each switch is a logic "high" when each switch is open. When a switch is activated, its corresponding signal (120, 121) goes to a logic "low". Of course, the opposite sense could be used for one or both switches and one or both signal levels.

At the S1 position, the camera may begin its automatic focusing process. Typically, the camera repeatedly evaluates the spatial contrast of the scene or a portion of the scene and actuates a focusing mechanism to maximize the spatial contrast. This process may involve moving the focusing mechanism one or more times through some or all of its operating range, and may take considerable time. The camera may also use the S1 position to measure the brightness of the scene and adjust parameters such as the exposure time and lens aperture setting that will be used for taking the photograph.

When the camera has determined that proper focus has been achieved in the S1 position, the camera may signal the user that focus has been achieved and then hold the focus mechanism in position to allow the user to recompose the photograph with the shutter release (117) still held in the S1 position. The user may then actuate the shutter release (117) fully, activating switch S2. This is sometimes called the "S2 position." At the S2 position, the camera proceeds to take the photograph with the focus mechanism setting and exposure settings determined while at the S1 position.

The typical camera operation described above works well in many photographic situations. It allows the photographer considerable control over the composition and treatment of the photograph. However, this typical procedure may be a hindrance in other situations.

In many cameras, the process of determining the proper focus and exposure settings may be time consuming and inflexible. That is, the camera performs the same sequence of steps for every photograph. The sequence of steps may include moving the lens focus mechanism through its entire operating range one or more times.

The photographer may actuate the shutter release (117) through its full travel, proceeding to the S2 position without pausing at the S1 position, indicating that the photographer wishes to take the photograph immediately. However, the camera may still proceed with the same time consuming series of operations it would have done had there been a pause at the S1 position. This results in a delay between the time the photographer indicated he wanted to take the photograph and the time at which it is actually taken. This delay may be disconcerting or annoying to the photographer, or may result in missing the event the photographer was trying to capture.

While each operation the camera performs in preparation for taking a photograph has the purpose of improving the chance of obtaining a quality photograph in some situation, at least some of the operations may be unlikely to help in the case of an urgent photograph. For example, including the possibility of having a subject extremely close to the camera requires the camera to search a disproportionately large range of focus mechanism positions, requiring considerable time. Many fast-moving subjects are far from the camera, so searching the close-up focus positions may cause an unnecessary delay in photographing these subjects.

The present invention provides a mechanism for the camera to sense the urgency of a photograph and tailor its operation accordingly. For urgent photographs, the camera may eliminate or modify certain time consuming operations that are unlikely to improve the photograph, thereby increasing the likelihood that the photograph will be taken when the photographer wishes. Alternatively or additionally, the camera may select a relatively short exposure time for urgent photographs on the assumption that the subject of an urgent photograph is also likely to be fast-moving.

One method for measuring the photographer's urgency in taking a photograph is to measure the time between the activations of switches S1 (115) and S2 (116). If there is a relatively long time between the activations of the two switches, the camera assumes that the photograph is not urgent and performs all of its available operations for ensuring picture quality in all situations. If there is a relatively short time between the switch activations, the camera assumes that the photograph is urgent, and may omit some optional operations, instead giving priority to taking the photograph quickly.

As shown in FIG. 1, signals indicating the states of switches S1 (115) and S2 (116) are connected to logic unit (110), which may contain a microprocessor with the ability to detect the states of the switches. It is straightforward to use the microprocessor to measure the time between transitions in the signals. The microprocessor may poll the switch signals, recording the time from its system clock when each switch closes and simply computing the difference in time.

Figure 2:
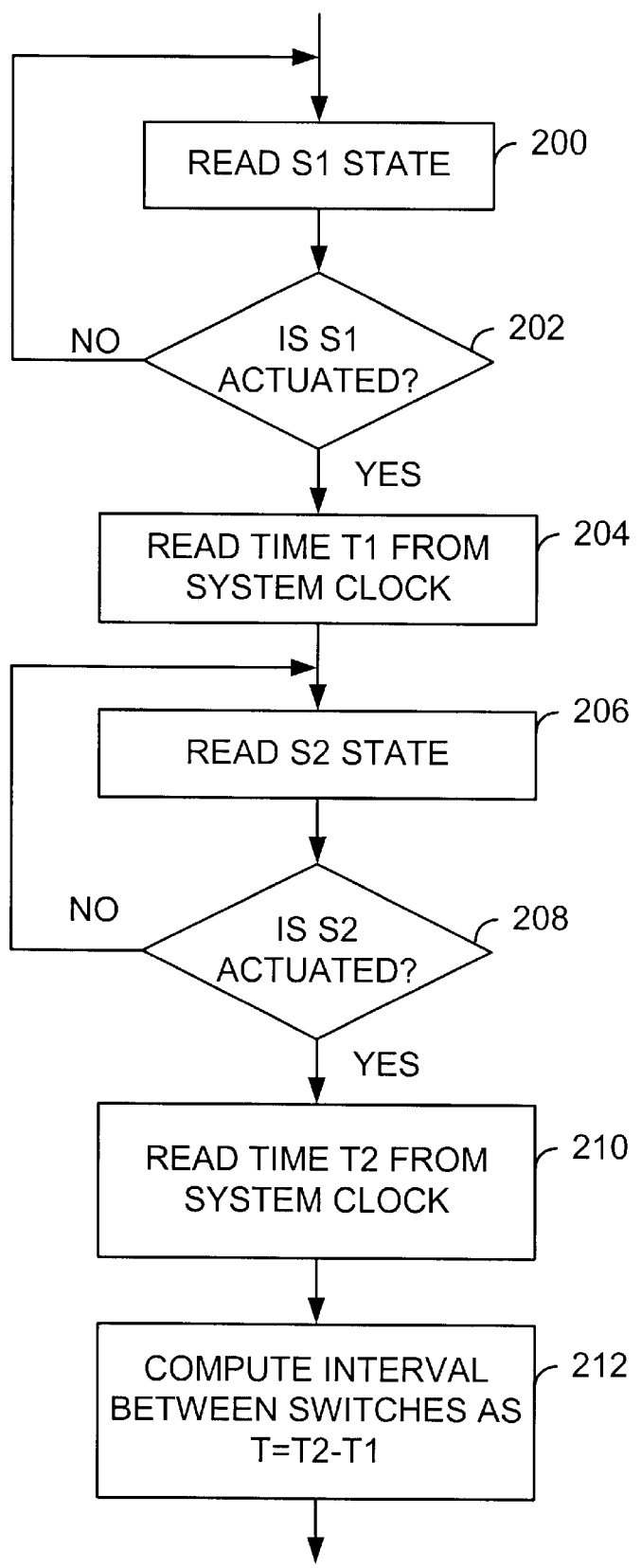
FIG. 2 is a flowchart depicting steps a camera may perform for measuring the time interval between two switch activations.

FIG. 2 depicts a flow chart showing steps that may be performed by the microprocessor in measuring the time between the activations of S1 (115) and S2 (116). In steps (200) and (202), the microprocessor waits for switch S1 (115) to be activated. Once S1 activation is detected, the microprocessor reads (204) the current time from the system clock, and then waits for switch S2 (116) to be activated in steps (206) and (208). When S2 activation is detected, the microprocessor reads (210) the current time from the system clock and computes (212) the elapsed time between the switch activations.

Alternatively, the switch signals may be configured to provide an interrupt signal to the microprocessor. The processor may respond to the S1 interrupt signal by recording the time at which the signal arrived, and respond to the S2 interrupt signal by recording the time at which the second signal arrived and computing the elapsed time between the signals.

Figure 3:
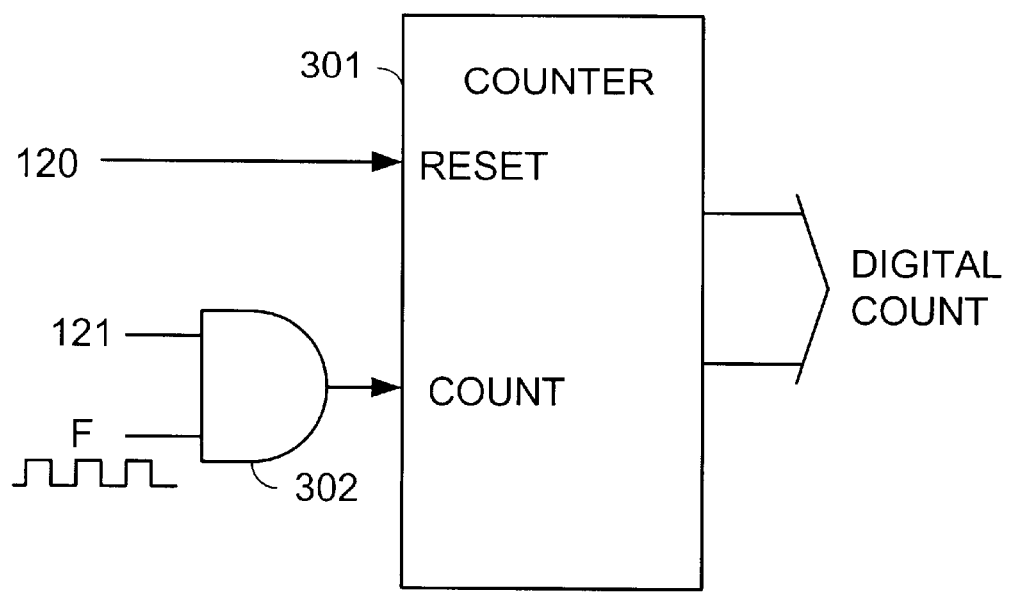
FIG. 3 is a schematic drawing of a circuit for measuring the time interval between two switch activations.

In still another embodiment, logic unit (110) may contain hardware for measuring the time between the activations of switch S1 (115) and switch S2 (116). FIG. 3 schematically shows one possible arrangement of hardware for this purpose. Signals (120) and (121) indicate the states of switches S1 (115) and S2 (116) respectively. While switch S1 (115) is open, signal (120) is a logic "high". Signal (120) is fed to the RESET input of counter (301), keeping the output digital count from the counter (301) at zero. Signal (121) from switch S2 (116) is also a logic "high", so that pulses from the cameras frequency generator are passed through AND gate (302).

When switch S1 (115) closes, the RESET input of counter (301) changes to a logic "low", allowing the digital output count to begin accumulating a count of the pulses reaching the COUNT input.

When switch S2 (116) closes, signal (121) changes to a logic "low", effectively stopping, by action of the AND gate (302), the pulse train from the camera's frequency generator from reaching the COUNT input of counter (301). The digital output count then reflects the time between the activations of switches S1 and S2 (115, 116), and is also an indication of the photographer's urgency in taking the photograph. The microprocessor in logic unit (110), recognizing that both switches (115, 116) are activated, may read the output count value.

One skilled in the art will recognize that there are many other methods for measuring the speed of actuation of the shutter release (117) in a camera, any of which will provide the information necessary for constructing an embodiment of the present invention. For example, the actuation speed could be measured could be measured by an encoder, by the voltage produced by a generator coupled to the shutter release, by the current induced by relative motion between a conductor and a magnet, by the pressure generated by the movement of a viscous fluid, or by a variety of other methods.

Once the camera has measured the actuation speed of the shutter release (117), a program running in the camera's microprocessor may make decisions about how to operate the camera based on the measured speed. Of course, if the camera has completed all of its pre-photograph activities prior to the activation of switch S2 (116), then the photograph may be taken immediately upon activation of S2 (116).

However, if the interval between the activations of switches S1 and S2 (115, 116) is shorter than the time required for the camera's most thorough available program of activities, then the camera modifies its behavior in one of several ways, depending on the time interval. There are a number of steps the camera may modify or abbreviate in order to reduce the total time required to take a photograph.

For example, the camera may truncate the range of focus mechanism positions it searches during its automatic focusing routine. Subjects of urgent photographs are seldom close to the camera, and the searching the range of possible focus positions close to the camera is disproportionately time consuming. Truncating the range to search only possible focus positions relatively far from the camera can greatly reduce the amount of time required to take the photograph, while adding little risk of failing to take a good photograph of a fleeting event.

If the speed of actuation of the shutter release (117) is detected to be extremely short, the camera could adopt an even more aggressive strategy for reducing the time required to focus. For example, the focus mechanism could simply be moved to focus at the hyperfocal distance for the lens, thus maximizing the range of distances from the camera in which subjects will be in focus, and taking very little time. This technique presents somewhat more risk of missing a good photograph of a subject relatively near the camera. This risk may be reduced by using a lens aperture setting that also maximizes the camera's "depth of field".

The hyperfocal distance for a lens is the closest distance to the camera that, when focused at, causes the range of distances in which objects are in acceptable focus to extend to infinity.

If the camera is a digital camera, other techniques may be possible for reducing the time required to take a photograph while adding little risk of missing a photographic opportunity. For example, a digital camera typically uses a computed measure of image contrast as an indication of focus quality. The time required to compute this measure may depend on the area of the camera's field of view used by the focusing method. If a photograph is determined to be urgent based on the measurement of the shutter release (117) actuation speed, a smaller area of the camera's field of view may be used for determining focus, thereby reducing the time required to estimate the focus quality.

Additionally, the number of trial focus positions might be reduced, as each trial position requires significant exposure and computation time. Using a lens aperture setting that maximizes the camera's field of view may allow significant reduction in the number of trial focus positions that need to be evaluated.

Figure 4:
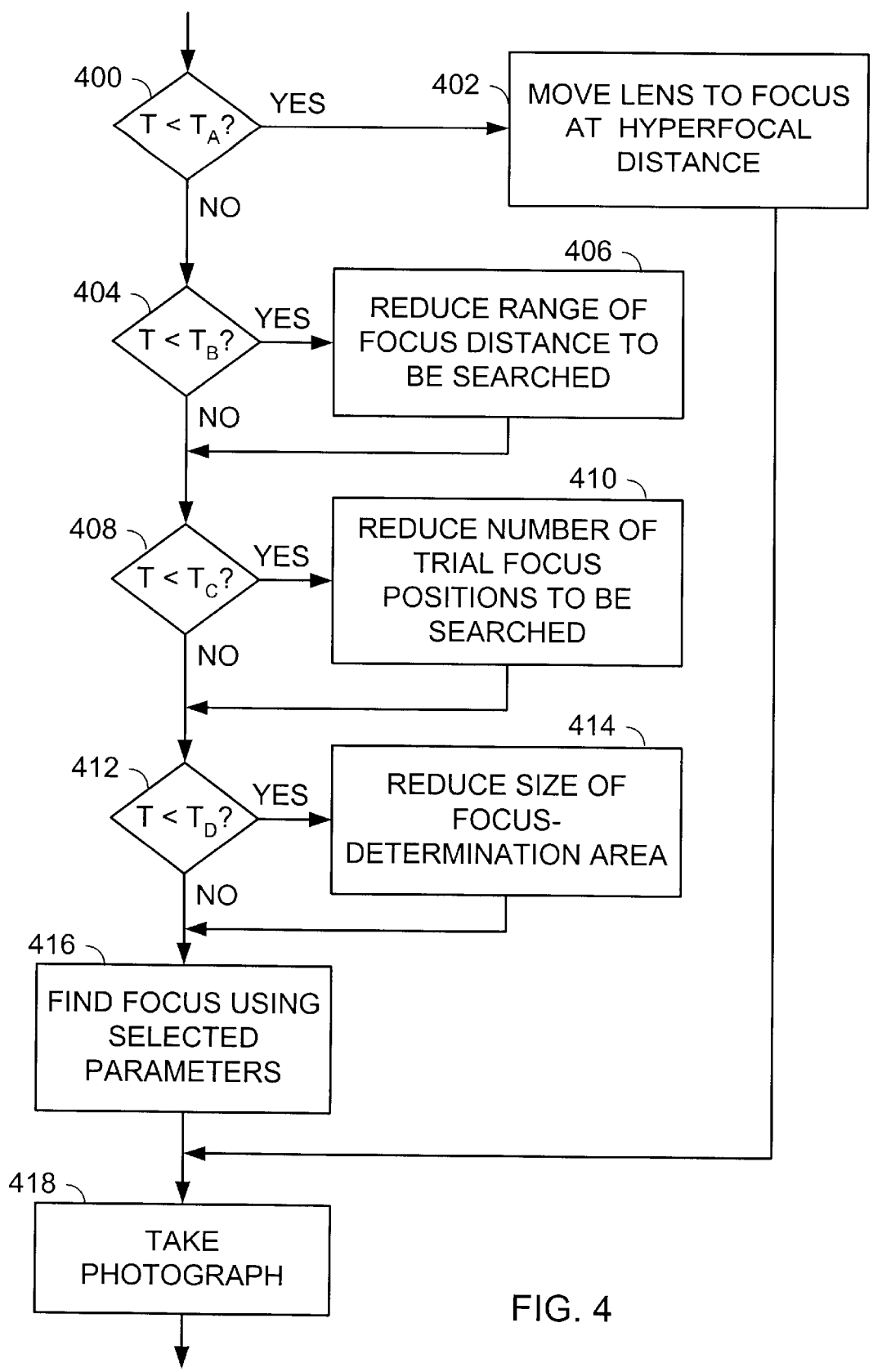
FIG. 4 is a flowchart depicting decisions a camera may make in adapting its operation to the urgency of a photograph.

FIG. 4 depicts a flow chart of one possible decision-making sequence that may be followed in accordance with an embodiment of the invention. Time intervals $T_A$, $T_B$, $T_C$, and $T_D$ may be arbitrarily set by the camera designer to represent lessening degrees of urgency.

In decision block (400) the time interval T, the interval between the activations of switches S1 and S2 (115, 116), is compared with a first threshold value $T_A$. If $T<T_A$, then the current photograph is determined to be very urgent, and control passes to step (402) where the lens focusing mechanism is moved to the position that causes the lens to be focused at its hyperfocal distance. From there, control passes to step (418) where the photograph is taken.

If T is not less than $T_A$, control passes to decision block 404, where T is compared with a second threshold value $T_B$. If $T<T_B$, the range of lens focus distances to be searched is narrowed, and control passes to decision block (408). Otherwise, control passes to decision block (408) directly.

At decision block (408), T is compared with a third threshold value $T_C$. If $T<T_C$, then the number of trial focus positions to be searched is reduced, and control passes to decision block (412). Otherwise, control passes to decision block (412) directly.

At decision block (412), T is compared with a fourth threshold value $T_D$. If $T<T_D$, then the size of the area of the camera field of view used to compute the focus measure is reduced, and control passes to step (416). Otherwise, control passes directly to step (416). As noted above, this technique is available if the camera is a digital camera.

At step (416), the camera performs its automatic focusing using the parameters determined in the previous steps based on the urgency of the photograph. Control then passes to step (418) where the photograph is taken. Of course the operation of a camera comprises other steps, such as determination of the proper exposure parameters for the photograph, that are omitted here for clarity in explaining the present invention.

In this manner, the camera has adapted its operation to the urgency of the photograph, as measured by the speed with which the photographer actuated the shutter release (117).

The foregoing description of the present invention has been presented for purposes of illustration and description. It is not intended to be exhaustive or to limit the invention to the precise form disclosed, and other modifications and variations may be possible in light of the above teachings. For example, other modifications not described here to a camera's normal operating could be made, or some of those described here could be omitted while still falling within the scope of the invention. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A camera, comprising a shutter release, which camera adapts its operation in response to a speed with which a user actuates the shutter release in that the camera:
    a) performs a first series of operations in taking a photograph in response to a first actuation of the shutter release; and
    b) performs a second series of operations for taking a photograph in response to a second actuation of the shutter release, the second actuation of the shutter release being faster than the first actuation, and the second series of operations taking less time than the first series.

2. A camera, comprising a shutter release and an automatic focus capability, which camera adapts its operation in response to the speed with which a user actuates the shutter release in that the camera:
    a) searches its entire range of available automatic focus positions when taking a photograph initiated by a first actuation of the shutter release; and
    b) searches a restricted range of available automatic focus positions when taking a photograph initiated by a second actuation of the shutter release, the second actuation being faster than the first.

3. A camera, comprising a shutter release and an automatic focus capability, which camera adapts its operation in response to the speed with which a user actuates the shutter release in that the camera:
    a) searches its entire range of available automatic focus positions when taking a photograph initiated by a first actuation of the shutter release; and
    b) focuses directly at a hyperfocal distance when taking a photograph initiated by a second actuation of the shutter release, the second actuation being faster than the first.

4. A camera, comprising a shutter release, which camera adapts its operation in response to the speed with which a user actuates the shutter release in that the camera:
   a) selects a first shutter speed in response to a first actuation of the shutter release; and
   b) selects a second shutter speed in response to a second actuation of the shutter release, the second actuation of the shutter release being faster than the first.

5. The camera of claim 4 wherein the second shutter speed is faster than the first.

6. The camera of claim 1 wherein the speed of actuation of the shutter release is measured as a time interval between the activations of two switches, which are activated sequentially by the shutter release.

7. The camera of claim 2 wherein the speed of actuation of the shutter release is measured as a time interval between the activations of two switches, which are activated sequentially by the shutter release.

8. The camera of claim 3 wherein the speed of actuation of the shutter release is measured as a time interval between the activations of two switches, which are activated sequentially by the shutter release.

9. The camera of claim 4 wherein the speed of actuation of the shutter release is measured as a time interval between the activations of two switches, which are activated sequentially by the shutter release.

10. The camera of claim 5 wherein the speed of actuation of the shutter release is measured as a time interval between the activations of two switches, which are activated sequentially by the shutter release.

11. A camera comprising:
    a) a detector that detects an urgency of a user;
    b) a focus mechanism; and
    c) logic that selects a predetermined range of search for the focus mechanism when high urgency is indicated by the detector.

12. A method for controlling a camera, comprising measuring a speed with which a user actuates a shutter release and adapting the operation of the camera in response to the measured speed by:
    a) controlling the camera in a first manner for taking a first photograph in response to a first actuation speed of the shutter release; and
    b) controlling the camera in a second manner for taking a second photograph in response to a second actuation speed of the shutter release, the second actuation speed being faster than the first and the second operating manner taking less time than the first.

13. A method of controlling a camera, comprising measuring a speed with which a user actuates a shutter release and adapting the operation of the camera in response to the measured speed by:
    a) searching a complete range of possible focus positions when taking a first photograph in response to a first actuation of the shutter release; and
    b) searching a restricted range of possible focus positions when taking a second photograph in response to a second actuation of the shutter release, the second actuation being faster than the first.

14. A method of controlling a camera, comprising measuring a speed with which a user actuates a shutter release and adapting the operation of the camera in response to the measured speed by:
    a) searching a complete range of possible focus positions when taking a first photograph in response to a first actuation of the shutter release; and
    b) focusing directly at a hyperfocal distance when taking a second photograph in response to a second actuation of the shutter release, the second actuation being faster than the first.

15. A method of controlling a camera, comprising measuring a speed with which a user actuates a shutter release and adapting the operation of the camera in response to the measured speed by:
    a) selecting a first shutter speed in response to a first actuation of the shutter release; and
    b) selecting a second shutter speed in response to a second actuation of the shutter release, the second actuation of the shutter release being faster than the first.

16. The method of claim 15 wherein the second shutter speed is faster than the first.

17. The method of claim 12 further comprising measuring the speed of actuation of the shutter release as a time interval between the activations of two switches, which are activated sequentially by the shutter release.

18. The method of claim 13 further comprising measuring the speed of actuation of the shutter release as a time interval between the activations of two switches, which are activated sequentially by the shutter release.

19. The method of claim 14 further comprising measuring the speed of actuation of the shutter release as a time interval between the activations of two switches, which are activated sequentially by the shutter release.

20. The method of claim 15 further comprising measuring the speed of actuation of the shutter release as a time interval between the activations of two switches, which are activated sequentially by the shutter release.

21. The method of claim 16 further comprising measuring the speed of actuation of the shutter release as a time interval between the activations of two switches, which are activated sequentially by the shutter release.

22. A digital camera, comprising a shutter release, which camera:
    a) selects a first focus-determination area in response to a first actuation speed of the shutter release; and
    b) selects a second focus-determination area in response to a second actuation speed of the shutter release, the second actuation of the shutter release being faster than the first.

23. The digital camera of claim 22 wherein the second focus-determination area is smaller than the first.

24. The digital camera of claim 22 wherein the speed of actuation of the shutter release is measured as a time interval between the activations of two switches, which are activated sequentially by the shutter release.

25. A method of controlling a digital camera, comprising:
    a) measuring a speed with which a user actuates a shutter release;
    b) selecting a first focus-determination area when taking a first photograph in response to a first actuation speed of the shutter release; and
    c) selecting a second focus-determination area when taking a second photograph in response to a second actuation speed of the shutter release, the second actuation speed being faster than the first.

26. The method of claim 25 wherein the second focus-determination area is smaller than the first.

27. The method of claim 25 further comprising measuring the speed of actuation of the shutter release as a time interval between the activations of two switches, which are activated sequentially by the shutter release.

28. A digital camera, comprising a shutter release, which camera:
   a) selects a first number of trial focus positions in response to a first actuation speed of the shutter release; and
   b) selects a second number of trial focus positions in response to a second actuation speed of the shutter release, the second actuation speed of the shutter release being faster than the first.

29. A method of controlling a digital camera, comprising:
   a) measuring a speed with which a user actuates a shutter release;
   b) selecting a first number of trial focus positions when taking a first photograph in response to a first actuation speed of the shutter release; and
   c) selecting a second number of trial focus positions when taking a second photograph in response to a second actuation speed of the shutter release, the second actuation speed being faster than the first.

30. A camera, comprising a shutter release and an automatic focus capability, which camera adapts its operation in response to the speed with which a user actuates the shutter release in that the camera:
   a) searches a first range of available automatic focus positions when taking a photograph initiated by a first actuation of the shutter release; and
   b) searches a second range of available automatic focus positions when taking a photograph initiated by a second actuation of the shutter release, the second actuation being faster than the first.

31. A camera, comprising a shutter release and an automatic focus capability, which camera adapts its operation in response to the speed with which a user actuates the shutter release in that the camera:
   a) searches a range of available automatic focus positions when taking a photograph initiated by a first actuation of the shutter release; and
   b) focuses directly at a hyperfocal distance when taking a photograph initiated by a second actuation of the shutter release, the second actuation being faster than the first.

32. A method of controlling a camera, comprising measuring a speed with which a user actuates a shutter release and adapting the operation of the camera in response to the measured speed by:
   a) searching a first range of possible focus positions when taking a first photograph in response to a first actuation of the shutter release; and
   b) searching a second range of possible focus positions when taking a second photograph in response to a second actuation of the shutter release, the second actuation being faster than the first.

33. A method of controlling a camera, comprising measuring a speed with which a user actuates a shutter release and adapting the operation of the camera in response to the measured speed by:
   a) searching a range of possible focus positions when taking a first photograph in response to a first actuation of the shutter release; and
   b) focusing directly at a hyperfocal distance when taking a second photograph in response to a second actuation of the shutter release, the second actuation being faster than the first.

* * * * *